United States Patent [19]

Ryan

[11] Patent Number: 4,937,679
[45] Date of Patent: Jun. 26, 1990

[54] DUAL DECK VIDEO RECORDING APPARATUS HAVING ENHANCED COPY PROTECTION AND METHOD FOR PROVIDING ENHANCED COPY PROTECTION TO SUCH A RECORDING APPARATUS

[75] Inventor: John O. Ryan, Cupertino, Calif.

[73] Assignee: Macrovision, Cupertino, Calif.

[21] Appl. No.: 210,665

[22] Filed: Jun. 23, 1988

Related U.S. Application Data

[63] Continuation-in-part of Ser. No. 935,055, Nov. 21, 1986, which is a continuation of Ser. No. 554,697, Nov. 23, 1983, abandoned, and a continuation-in-part of Ser. No. 895,045, Aug. 11, 1986, abandoned, and a continuation-in-part of Ser. No. 38,163, Apr. 14, 1987, Pat. No. 4,819,098.

[51] Int. Cl.$^5$ .............................................. H04N 5/782
[52] U.S. Cl. ...................................... 358/335; 360/60; 380/5
[58] Field of Search ............... 358/310, 335; 360/37.1, 360/60; 380/5, 7, 10, 15

[56] References Cited

U.S. PATENT DOCUMENTS 3,947,884 3/1976 Yokota et al. ..................... 360/60 X
4,163,253 7/1979 Morio et al. ........................... 380/5

Primary Examiner—Robert L. Richardson
Attorney, Agent, or Firm—Flehr, Hohbach, Test, Albritton & Herbert

[57] ABSTRACT

A method and apparatus are described for preventing a dual deck video recorder from being used to record a copy-protected video signal. A switch is included on the recorder to indicate whether a video signal input to one of the deck locations for recording originates externally of the machine or internally at another deck location. Recording is prevented whenever the switch indicates that the video signal originates from the other deck location if the video signal at such location includes a selected copy-protect signal. If a video signal to be recorded comes from externally of the machine, copying of the same is prevented if (1) the video signal includes the copy-protect signal; or (2) the video signal to be copied is the same as the play back video signal and the latter has the selected copy-protect signal.

16 Claims, 5 Drawing Sheets

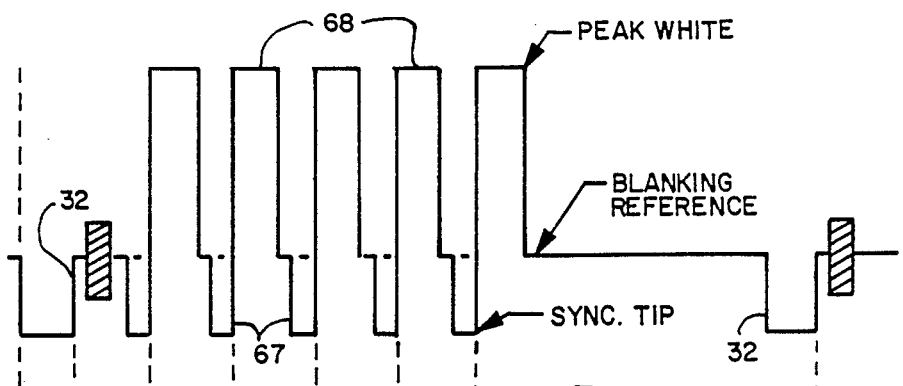
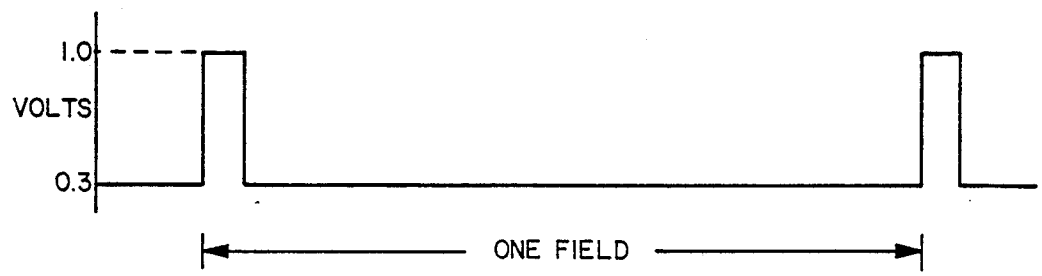
FIG. 5

4,937,679

DUAL DECK VIDEO RECORDING APPARATUS HAVING ENHANCED COPY PROTECTION AND METHOD FOR PROVIDING ENHANCED COPY PROTECTION TO SUCH A RECORDING APPARATUS

CROSS REFERENCES TO RELATED APPLICATIONS

This application is a continuation-in-part of my copending patent application Ser. Nos. 06/935,055 filed Nov. 21, 1986 for METHOD AND APPARATUS FOR PROCESSING A VIDEO SIGNAL SO AS TO PROHIBIT THE MAKING OF ACCEPTABLE VIDEO TAPE RECORDINGS which is, in turn, a continuation of patent application Ser. No. 06/554,697 filed Nov. 23, 1983, now abandoned; patent application Ser. No. 06/895,045 filed Aug. 11, 1986, now abandoned for METHOD AND APPARATUS FOR PREVENTING THE COPYING OF A VIDEO PROGRAM; and patent application Ser. No. 07/038,163 filed Apr. 14, 1987 for METHOD AND APPARATUS FOR CLUSTERING MODIFICATIONS MADE TO A VIDEO SIGNAL TO INHIBIT THE MAKING OF ACCEPTABLE VIDEO TAPE RECORDINGS.

BACKGROUND OF THE INVENTION

The present invention relates to dual deck video recording apparatuses (commonly referred to as "VCRs") of the dual deck type, i.e., apparatuses for copying video signals onto a magnetic storage medium that have more than one operative location for magnetic media. It relates more particularly to a dual deck VCR apparatus and method for preventing use of the same to record a video signal having a copy-protect signal.

Various schemes have been developed for preventing the unauthorized copying of a video signal, such as one encoded on magnetic tape in a video cassette. One of the schemes which has been widely accepted is that described and claimed in applicant's U.S. Pat. No. 4,631,603. This scheme, as well as others, capitalizes on the differences between the circuitry in video recorders and that in standard television sets or monitors. In this connection, while it is desired to adversely affect recording, it is not desired to do so in a manner which will prevent an acceptably viewable picture from being displayed by ordinary television sets and monitors. The scheme described in the aforesaid patent accomplishes this result by adding pulse pairs to a video signal in those aspects of the same which define the vertical blanking intervals during video replay, to interfere with the automatic gain control (AGC) circuitry of a video recorder.

So-called "dual deck" VCR arrangements present special potential problems relative to such copy-protect techniques. Such an arrangement has two different decks or locations, one for playback of a video tape and the other for recording a tape. With such an arrangement, a copy of the video signal recorded on a tape or other magnetic media with a carrier signal, can be fed directly from the playback location to the recording mechanism at the other location without the necessity of the video signal being passed through the automatic gain control and other processing circuitry included to condition signals fed from the exterior of the VCR. Such direct internal copying not only circumvents any copy-protect scheme which relies on circuitry through which externally applied signals pass, it also enables high quality copies to be made. That is, a video signal from the playback deck, after amplification, can be applied directly to the recording mechanism, thus bypassing much complex electronic signal processing, including modulation and demodulation processing, which degrades picture and sound quality. Moreover, copying with a dual deck VCR is quite convenient in that no external cabling is necessary.

SUMMARY OF THE INVENTION

The present invention is a dual deck apparatus which responds to a preselected signal portion, such as a copy-protect signal, of a video signal by preventing copying in a dual deck VCR of a video signal having the preselected portion irrespective of whether or not the dual deck VCR is set to make an internal copy bypassing the processing circuitry which may be relied on to prevent an acceptably viewable copy from being made. (It is to be noted that it is recognized that it is not the video signal itself that is either recorded onto, or played back from, a video tape. Rather, it is a magnetic representation of either such signal or, more often, a carrier signal which is frequency modulated by the video signal. For simplicity, though, the specification, including the claims, refers to recording or playing back the video signal. This is meant to include any representation of the information defined by such signal.) The invention also includes a method for preventing a video signal having a preselected signal portion from being copied from one magnetic medium to another in a dual deck VCR or similar apparatus.

The method and apparatus of the invention also prevents the recording of a video signal which is played back by such a dual deck VCR and is taken externally of the machine to remove a copy-protect portion of a video signal before it is routed to the recording means.

The invention is best summarized in connection with FIG. 7 which is a logic flow chart of the same.

BRIEF DESCRIPTION OF THE DRAWINGS

With reference to the accompanying four sheets of drawing:

FIGS. 4a-4f are waveforms showing the copy-protect signal of U. S. Pat. No. 4,631,603 and the output signal of various circuit blocks of the detector of FIG. 3;

FIG. 5 is a waveform for the envelope for a full field of the output signal at a block in FIG. 3a.

DETAILED DESCRIPTION OF THE PREFERRED EMBODIMENTS

Figure 1:
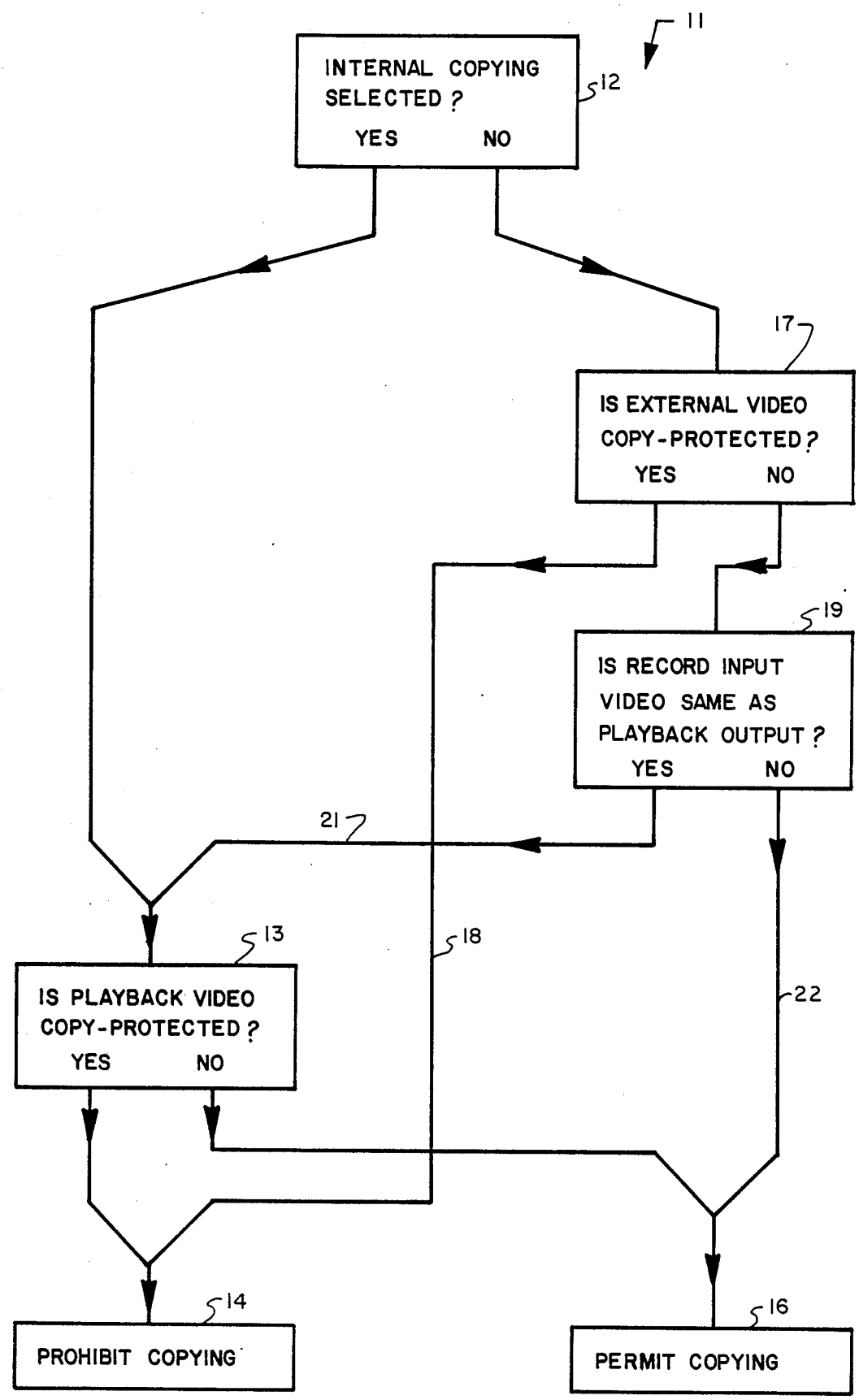
FIG. 1 is a logic diagram illustrating the invention.

Reference is first made to FIG. 1 which is a flow chart of decisions made by the method and apparatus of the instant invention. The apparatus is a dual deck arrangement in which either high quality copying of a video signal internally can be selected by amplifying and feeding the output from a playback deck of the apparatus to the recording heads of the recording deck, or a video signal can be directed from externally of the machine to its recording deck for recording. The dual deck arrangement of the invention is designed to prevent unauthorized copying even if the video signal being played back is being viewed or otherwise utilized, simultaneously with it being copied by the recording deck. Operation of the playback and recording mechanisms is conventional, except for operations relating to preventing use of the arrangement to make copies of a copy-protected video signal. For this reason, only the latter aspect of the invention is represented in FIG. 1.

The flow chart, generally referred to by the reference numeral 11, is a decision tree which includes first decision logic represented by block 12 which determines whether or not internal copying by the dual deck arrangement has been selected. If it has been selected, it is then determined whether or not the video signal at the playback location has the copy-protect signal. This logic decision is represented in FIG. 1 by block 13. If it is found that the video signal is copy-protected, then a prohibit signal is generated which prevents the recording means from recording the signal. The generation of such prohibit signal is represented in FIG. 1 by the block 14. If the signal being played back does not include the copy-protect signal, then copying is permitted as is represented in FIG. 1 by block 16. It should be noted that checking the playback signal to determine if it contains the copy-protect signal, assures that copying will be prohibited even if a mechanism is included externally of the machine for disabling the copy-protect feature.

The decisions which must be made if the dual deck arrangement is selected to copy an externally applied signal, are more complex. A decision first is made as to whether or not the input includes the copy-protect signal. If it does, the prohibit signal, as is represented by the line 18 extending from the "yes" of the block 17 to the block 14, is generated. If the video signal which is being sent to the recording deck for recording does not have the copy-protect signal, it is determined if the video signal input to the recording deck is the same as the video signal emanating from the playback deck. (This question is asked because the user may wish to play back one program on the playback deck while recording a different program on the recording deck.) This is represented in FIG. 1 by block 19.

If the video signal emanating from the playback deck is the same as the signal fed to the recording deck, it is determined if the signal being played back from the playback mechanism is copy-protected, as is represented by the logic flow line 21 extending between blocks 19 and 13. If it is copy-protected, the copying prohibit signal is generated. Thus, one cannot circumvent the purpose of including the copy-protect signal, simply by having the video signal fed externally of the machine and disabling or removing the copy-protect signal portion. If the video signal being input for recording is not the same as the video signal being output from the dual deck machine, copying is permitted as is represented by logic flow line 22.

It should be noted that from the conceptual standpoint it is not necessary to determine if internal copying has been selected before preventing recording. If the input to the recording deck is copy-protected, recording can be prevented irrespective of whether or not internal or external copying has been selected.

Figure 2:
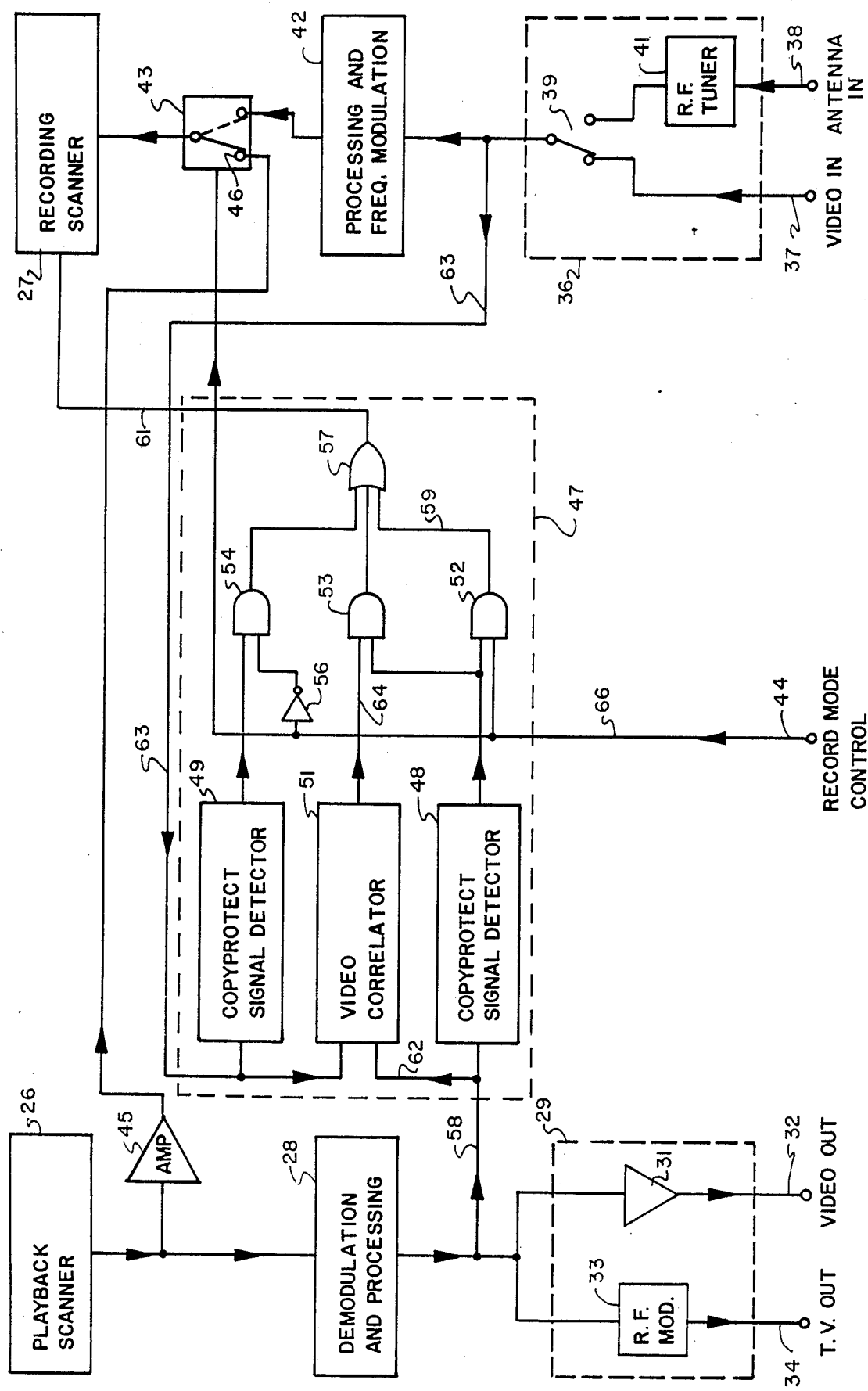
FIG. 2 is a block diagram of a preferred embodiment of the apparatus of the invention.

FIG. 2 is a block diagram of a preferred embodiment of the instant invention. Those aspects of the dual deck VCR which are conventional in nature will not be described in detail. With reference to such figure, it includes two separate locations (decks) for magnetic storage media, e.g., video tapes in a cassette. One of these locations, represented by block 26, is for playing back a video signal, whereas the other location, represented by block 27, is for recording a video signal. Both of these locations include the conventional circuitry and mechanisms typically associated with the function for which it is intended and, in this connection, the blocks are referred to in the drawing respectively as a "playback scanner" and a "recording scanner" to indicate the common construction of playback and recording mechanisms. While the invention is being described as a dual deck arrangement in which the playback and recording functions of the VCR are simply separated from one another, it will be recognized by those skilled in the art that the invention is equally applicable to dual deck VCRs in which the playback and recording functions are duplicated, e.g., one or both locations includes mechanisms for both playback and recording of video signals.

As mentioned previously, a dual deck VCR permits copying of a video signal on one magnetic storage medium onto another without the necessity of such signal having to pass through processing and modulation/demodulation circuitry. In this connection, the video signal output from playback scanner 26 is fed to conventional demodulation and processing circuitry—including de-emphasizing circuitry—as is represented by block 28. The demodulated video signal is then fed to output means, generally referred to by the reference numeral 29. Such output means includes an amplifier 31 and a "video out" external connector represented at 32. It also includes an RF modulator 33 and an external connector for providing TV output 34. (Such RF modulation by modulator 33 enables the signal to be modulated for viewing on a selected channel or channels of a television set, typically channel 3 and/or 4.)

The dual deck apparatus of the invention further includes an input means 36 to facilitate input of a video signal to be recorded from externally of the machine. Such input includes a "Video in" external connection 37 and an "Antenna in" external connection 38. An input switch represented at 39 is also provided to enable a user to select between video input and input from a TV antenna. An RF tuner represented at 41 is also provided as part of the input for enabling selection of the appropriate T.V. channel or the like to be recorded.

The signal from the input means is directed through conventional processing circuitry, including circuitry for frequency modulation, pre-emphasis clipping, etc. Such circuitry may include automatic gain control circuitry of the type which will react to certain copy-protect signals on an externally applied video signal to be copied by interfering with the normal video signal levels. The result is that copies which are made will be unacceptable for viewing. As mentioned previously, though, with the instant invention the presence of such copy-protect signals will be detected, and a prohibit signal will be generated which will prevent the recording means from making a copy.

One aspect of the instant invention is to permit authorized copying by the recording means of a video signal at the playback means location without going through the processing circuitry, whereas such direct copying of a video signal having the copy-protect signal is prohibited. In this connection, the apparatus of the invention includes a switch, generally referred to by the reference numeral 43, which has two positions, one illustrated in full in which it is directly connected to the playback scanner and another illustrated in phantom in which it receives the video signal from the processing and frequency modulation circuitry 42 for recording. The position of the switch 43 is controlled externally of the apparatus by a select switch represented schematically at 44 as a "record mode" control. As illustrated, the switch control signal also is directed to logic to be described infra which reacts to the switch position.

Besides enabling high quality copies to be made by allowing an operator to bypass complex electronic signal processing which typically degrades picture and sound quality, the dual deck apparatus of the invention simplifies the making of duplicate copies. That is, external cable hookups and the like are not necessary. The video signal which is output from the playback means 26 (the frequency modulated signal at the playback mechanism) is fed directly, after amplification represented by amplifier 45, to the internal recording pole 46 of switch 43 for application to the recording scanner. (The recording scanner will be prohibited from operating if the signal output from the playback scanner includes the copy-protect signal, as will be explained in more detail hereinafter.)

Circuitry is included as part of the invention, to implement the logic flow chart of FIG. 1. Such circuitry is generally enclosed within the dotted line block 47. It includes a detector 48 for generating an output indicating whether or not the video signal outputted from the playback scanner includes the copy-protect signal, and a second detector represented at 49 for generating an output indicating if the copy-protect signal is present on the external video signal to be copied. (While from the theoretical standpoint such detection could either be of the frequency modulated video signal as it exists on the magnetic tape or even of the magnetic representation of the same, in this preferred implementation it is simpler to check the video signal output which is furnished after the information on the tape is converted to an electrical signal and the video signal is demodulated.) It also includes a video correlator 51 which determines if program(s) defined by the video signal emanating from the playback means is the same as the program(s) defined by the video signal externally input to the recorder.

The copy-protect circuitry 47 of the invention also includes two-input terminal AND gates 52-54, an invertor 56, and a three-input terminal OR gate 57.

Detector 48 is connected, as illustrated schematically via line 58, to the output of the demodulation and processing circuitry 28 to enable detection by the same of the presence, or non-presence, of a copy-protect signal on any video signal emanating from the playback deck. Detector 48 will respond to the presence of a copy-protect signal on such output by delivering an activate signal to one of the input terminals of gate 52. When the record mode control is in the "internal" record mode, an activate signal also will be fed to the other input terminal of gate 52, with the result that the gate will generate an activate signal at its output which will be directed to one of the input terminals of OR gate 57, as is represented by flow line 59. OR gate 57 will respond thereto by generating a prohibit signal at its output which is directed, as is represented by flow line 61, to the recording means. The recording means reacts thereto by preventing the video signal which is fed directly to the recording deck from being recorded, as discussed above.

As discussed previously, the invention is also designed to prohibit recording in certain situations when an external video signal is applied to the recording means. One of these situations is when the program defined by a video signal being played is the same as the program defined by the video signal that is being fed to the circuitry for recording and the signal being played includes the copy-protect signal portion. To this end, the video signal which is generated by the playback scanner is directed to the video correlator 51 as represented by lines 58 and 62. The video signal it is desired to be recorded is also fed to the video correlator 51, as is represented by flow line 63. The video correlator compares the playback output signal to the record input video signal and, if they are the same, activates one input of AND gate 53, as is represented by flow line 64. The other input of AND gate 53 is connected to the output of detector 48 as illustrated, with the result that the output of the AND gate 53 will be activated whenever there is both a correlation between the two video signals and the playback output has the copy-protect signal. The output of AND gate 53 activates OR gate 57 to generate the prohibit recording signal discussed previously.

It should be noted that use of the video correlator enables one to playback a copy-protected program for viewing, while recording a different non-copy-protected program. It is only when the program being played back is the same as the program to be recorded and the program being played back is copy-protected, that the prohibit signal is generated.

The invention also is designed to prevent recording of any video signal which includes the copy-protect signal portion, irrespective of the presence of processing circuitry and/or the effectiveness of the same to render any recording which is made acceptable for viewing. That is, the invention prevents recording without reliance on processing circuitry whenever external copying has been selected. To this end, all externally applied video signals to be recorded are directed to the detector 49, as is represented by the connection of the detector's input to flow line 63. Detector 49 reacts to the presence of a copy-protect signal on the video signal by applying an activate signal to one of the inputs of AND gate 54. As is illustrated, the other input terminal of such AND gate is connected through invertor 56 to the record mode control flow line 66 so that when switch 43 is connected to receive an externally applied video signal, such input terminal will be activated. Line 66 represents, in effect, means for indicating whether the recording means is connected to the external input means or is connected to the output video signal of the playback scanner. Thus, when a copy-protect signal portion is detected on the externally applied signal, the AND gate 54 will activate OR gate 57 to generate a record prohibit signal to be fed to the recording means.

The preferred embodiment of the invention being described is particularly useful when the copy-protect signals are pulse pairs applied to portions of a video signal during the vertical blanking interval, in accordance with the teachings of U.S. Pat. No. 4,631,603. These pulse pairs are, in essence, signal segments which provide voltage levels to the video signal at locations at which they are normally not required to produce a desired display, i.e., define the picture or operate the display mechanism. It will be recognized, however, that the invention is not limited to the copy-protect signal being of any particular type. From the broad standpoint, it could be any selected portion of a video signal which may be added for detection, irrespective of whether or not such video signal will interfere with the processing circuitry associated with recording.

Figure 3A:
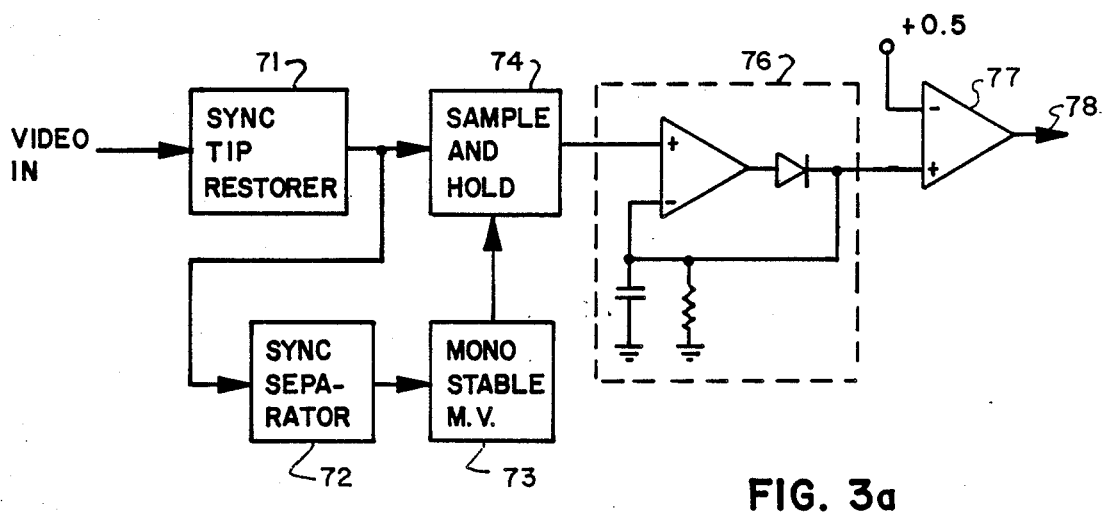
FIGS. 3a-3c are three different preferred implementations of a copy-protect signal detector of the apparatus of the invention.
Figure 3B:
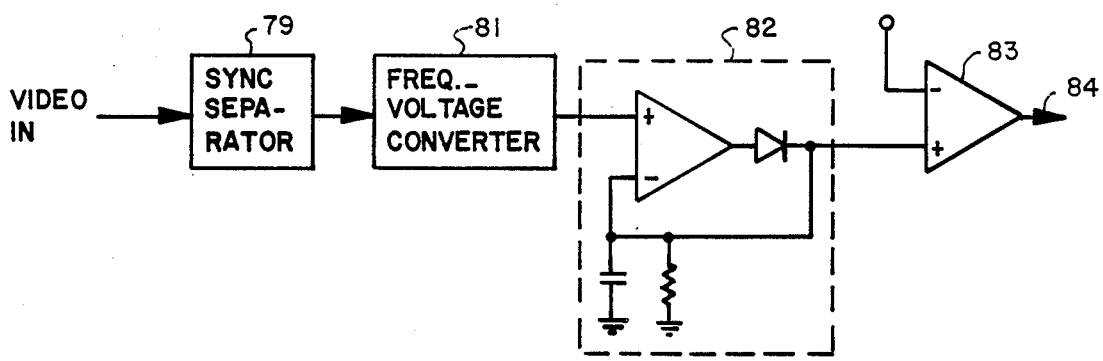
Figure 3C:
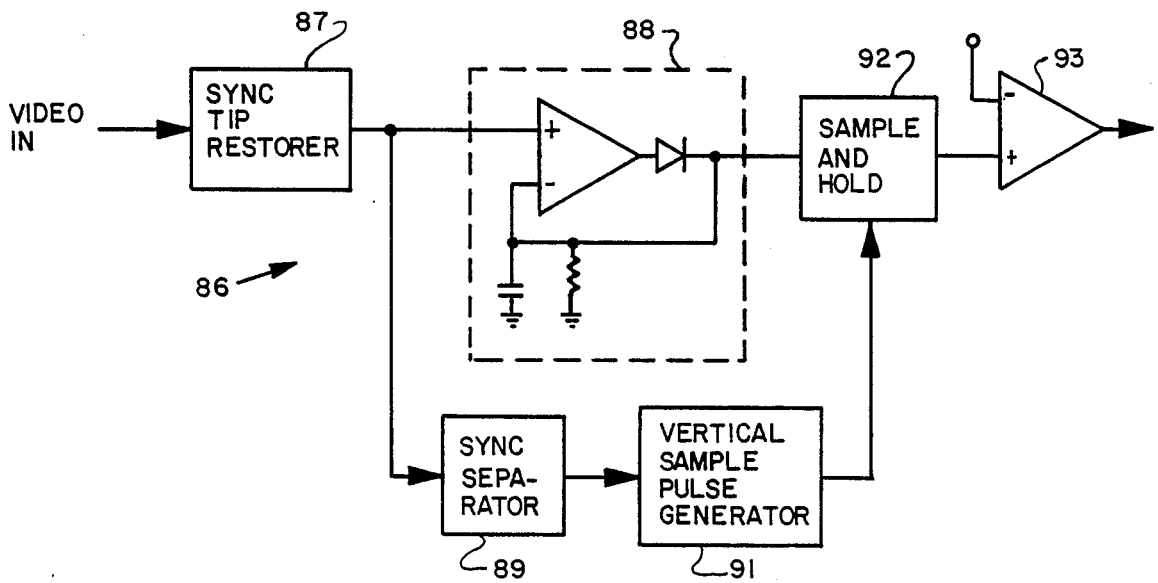

When the copy-protect signal is of the type described and claimed in U.S. Pat. No. 4,631,603, the pulse pairs discussed previously are made up of alternate pseudo-sync pulses 67 and positive (or white) pulses 68 as illustrated in FIG. 4a. FIGS. 3a-3c depict details of three alternate copy-protect signal detectors suitable for detectors 48 and 49 in such an instance. With reference first to FIG. 3a, the video signal on line 63 or line 58 is fed to a sync tip restorer 71 which clamps the sync tips to a reference level, preferably 0 volts. The output of the sync tip restorer has essentially the same waveform as the original signal. The output waveform of the various circuits represented in FIG. 3a by blocks are illustrated in FIG. 4. The output of restorer 71 is connected to a sync separator 72 which produces an output of sync pulses. These sync pulses are fed to a monostable multivibrator 73. The multivibrator is triggered by the trailing edges of the input sync pulses to generate nominally three microsecond sampling pulses. These pluses activate a sample and hold circuit 74 which also receives the output of sync tip restorer 71. Thus, sample and hold circuit 74 generates an output which represents the voltage level of the back porches of the modified video signal and holds it until the next sample. The envelope of the resultant output of sample and hold circuit 74 is shown more clearly in FIG. 5, which shows such envelope having a level of 0.3 volts during normal video horizontal lines and a level of 1 volt for those lines in the vertical blanking interval having the copy-protect signal.

The output of sample and hold circuit 74 is applied to the positive input of a positive voltage peak detector 76 which holds its most positive value for the duration of several fields. This assures that the output will have a value throughout the receipt of the modified video signal so that no part of the video signal can be recorded. The output of peak detector 76 is thus a constant voltage of about +0.3 volts in the case of a normal video signal and about +1.0 volt when the copy-protect signal corresponds to FIG. 4a.

The output of detector 76 is joined to the positive input of the differential comparator 77. The negative input of comparator 77 is preferably connected to a positive 0.5 volt reference voltage. Comparator 77 thereby produces an output on lead 78 having an activate logic level, i.e., one which is high in the case of a modified or copy-protected video signal, and an inactivate (low) signal in the case of a normal video signal.

The circuitry to perform the functions identified by the blocks of FIG. 3a is well-known to persons of ordinary skill in the art and it does not form an aspect of the present invention other than in combination with the other circuits as described. They are therefore not discussed in detail.

Referring now to FIG. 3b, an alternative embodiment of a detector is illustrated. The method of this embodiment relies on detecting the presence of the tightly grouped pseudo-sync pulses. Thus, although it is operable on the copy-protect signal waveform shown in FIG. 4a, it will be appreciated that the positive pulses are not utilized specifically, and therefore could be deleted. In such case, the wave form would look similar to the one in FIG. 4b, i.e., the one labelled "output of sync sep. 72". Further, other forms of waveform could be used which also produce a frequency of normal sync pulses.

The input video signal is fed to a sync separator 79 which produces an output similar to that of sync separator 72. The resulting series of pulses is input to a frequency-to-voltage converter 81. Convertor 81 generates an output voltage proportional to the frequency of its input pulses. The output of convertor 81 will thus have the general characteristics of the waveform of FIG. 5, in that it will be most positive during the vertical interval region corresponding to the increased sync frequency. The output of convertor 81 is coupled to a positive voltage peak detector 82 and differential comparator 83 which correspond to detector 76 and comparator 77, respectively, of the previously described embodiment. Detector 82 and comparator 83 are connected in the same arrangement as their corresponding elements in FIG. 3a, with the result the same logic level indication of the presence or absence of the modified or copy-protected video signal as was discussed with reference to the embodiment in FIG. 3a, is present on output line 84.

FIG. 3c shows yet a third exemplary embodiment of a detector. Detector 86 functions similar to the detector of FIG. 3a in that it detects the presence of the white pulses by peak-detecting the video signal and sampling this peak-detected signal during the vertical blanking interval.

Specifically, the video signal is input to a sync tip restorer 87, the output of which is applied to a positive peak detector 88 having a fast charge time constant (less than 1 microsecond) and a long discharge time (about 100 microseconds). The output of sync tip restorer 87 is also connected to a sync separator 89 for generating an output waveform similar to that of sync separator 72 described with reference to FIG. 3a. The output of separator 89 is coupled to a vertical sample pulse generator 91. Generator 91 produces a series of sampling pulses for activating a sample and hold circuit 92. Circuit 92 receives as input the output of peak detector 88. Thus, the output of the positive peak detector is sampled in sample and hold circuit 92 during the vertical interval at a time which coincides with the occurrence of the anti-copying waveform.

The output of circuit 92 will be at +0.3 volts in the case of a normal video signal and at about 1.0 volt in the case of a video signal modified or copy-protected as described. The output of sample and hold circuit 92 is converted to logic levels as described with reference to the embodiment of FIG. 3a by a differential comparator 93.

Since this third method and embodiment do not rely on the presence of the pseudo-sync pulses, a waveform without them could be used. Such a waveform would be like the waveform in FIG. 4a with the pseudo-sync pulses removed. The positive (white) pulses would then extend from the blanking reference, as indicated by the dashes at that level in the waveform shown.

Figure 6:
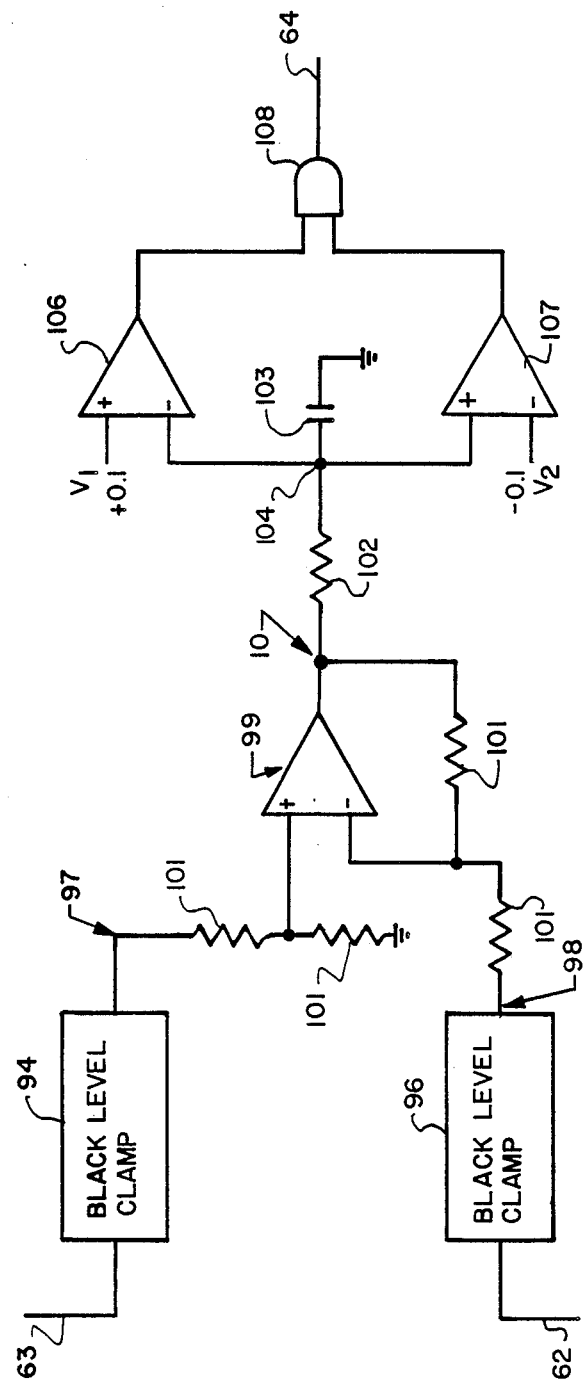
FIG. 6 is an implementation of a video correlator of the apparatus of the invention.

FIG. 6 shows a preferred embodiment of video correlator 51 of FIG. 2. The two signals to be correlated, i.e., the video signal to be recorded on line 63 and the video signal, if any, emanating from the playback deck on line 62, are applied to black level clamps 94 and 96. These circuits, which are well-known in the art and need not be described in detail here, ensure that the video at their respective output terminals 97 and 98 has its blanking reference levels set to zero volts. Amplifier 99 in association with resistors 101 acts as a differential amplifier with a gain of unity. The signal at the output amplifier 99 is thus equal to the difference between the black-level-clamped input video signals. This signal is filtered by resistor 102 and capacitor 103, arranged to have a time constant of about one second. When the video input signals are the same, the voltage at 104 will be low—typically between −0.1 and +0.1 volts. When the video inputs are of different programs, the voltage at 104 will, from time-to-time during the programs, be outside these limits. Voltage 104 is sensed by a window discriminator comprising differential comparators 106 and 107, voltage references $V_1$ and $V_2$, and AND gate 108. The operation of a window discriminator is well understood in the art and will not be described further. If the voltage at 104 is between the limits of $V_1$ and $V_2$ (+0.1 and −0.1 volts respectively) then the output at 108 will be at a high (activate) logic level indicating that the input video signals are very probably identical. If the voltage at 104 is outside these limits, then the output at 108 will be a low logic level indicating that the input video signals are not the same.

While the invention has been described in connection with preferred embodiments, it will be appreciated by those skilled in the art that various changes can be made without departing from its spirit. The coverage afforded applicants is therefore defined by the claims and their equivalents.

What is claimed:

1. In apparatus for copying a video signal on magnetic storage medium, said apparatus having more than one operative location for magnetic media, the combination comprising:
   (a) Recording means at a first one of said locations for magnetically recording a video signal on magnetic storage medium at said location;
   (b) Input means for directing an externally supplied video signal to said recording means for recording;
   (c) Playback means at a second one of said locations for outputting a video signal from magnetic storage medium at said second location;
   (d) A detector for determining if a preselected signal portion is on magnetic storage medium at said second location; and
   (e) A signal generating means responsive to said detector determining the presence of said preselected signal portion by generating a prohibit signal which prevents said recording means from copying said video signal.

2. The apparatus of claim 1 wherein said detector determines if said preselected signal portion is defined by data on said second magnetic storage medium at said second location by detecting the presence, or non-presence, of said preselected signal portion on the video signal outputted by said playback means.

3. The apparatus of claim 1 further including switch means for connecting alternatively to said recording means, said input means for an externally supplied video signal and said video signal output from said playback means.

4. The apparatus of claim 3 further including means indicating whether said recording means is connected to said external input means or to the output video signal of said playback means.

5. The apparatus of claim 3 further including video correlator means for determining if the program defined by video signal output from said playback means is the same as the program defined by the video signal input to said recording means.

6. The apparatus of claim 5 wherein said video correlator includes means for clamping portions of said video signals to the same voltage level.

7. The apparatus of claim 5 wherein said video correlator includes means for determining if the difference between the voltages of said video signals is outside of a predetermined range.

8. The apparatus of claim 1 wherein said preselected signal portion includes a signal segment which has a voltage level at a location at which it is normally not required by said video signal to produce a desired display, and said detector detects the presence of said voltage level at said location.

9. The apparatus of claim 8 wherein said location having said preselected signal segment occurs during the vertical blanking interval of said video signal.

10. The apparatus of claim 8 wherein said detector includes a voltage peak detector for detecting the presence of said voltage level at said location.

11. A method for preventing a video signal having a preselected signal portion from being copied from one magnetic medium to another by a machine having more than one operative location for magnetic media, comprising the steps of:
   (a) Providing a recording means at a first one of said locations for magnetically recording a video signal on magnetic storage medium at said location;
   (b) providing input means for directing an externally supplied video signal to said recording means for recording;
   (c) providing a playback means at a second one of said locations for outputting a video signal from magnetic storage medium at said second location;
   (d) determining if said preselected signal portion is present on magnetic storage medium at said second location; and
   (e) generating when it is determined that said preselected signal portion is present on said magnetic storage medium, a prohibit signal which prevents said recording means from copying said video signal.

12. The method of claim 11 further including the step of connecting alternatively to said recording means, said input means for an externally supplied video signal and a video signal output from said playback means.

13. The method of claim 12 further including the step of determining if the program defined by video signal output from said playback means is the same as the program defined by the video signal input to said recording means.

14. The method of claim 11 wherein said preselected signal portion includes a signal segment which has a voltage level at a location at which it is normally not required by said video signal to produce a desired display, further including the step of detecting the presence of said voltage level at said location.

15. The method of claim 14 wherein said location having said preselected signal occurs during the vertical blanking interval of said video signal.

16. The method of claim 11 further including the step of preventing recording by said recording means of an externally applied video signal having said preselected signal portion.

* * * * *